(12) United States Patent
Choi et al.

(10) Patent No.: US 11,031,593 B2
(45) Date of Patent: Jun. 8, 2021

(54) METHOD OF PRODUCING COBALT-COATED PRECURSOR, COBALT-COATED PRECURSOR PRODUCED THEREBY, AND POSITIVE ELECTRODE ACTIVE MATERIAL PREPARED USING SAME

(71) Applicants: ECOPRO BM CO., LTD., Chungcheongbuk-do (KR); SAMSUNG SDI CO., LTD., Yongin-si (KR)

(72) Inventors: Moon Ho Choi, Chungcheongbuk-do (KR); Jong Seung Shin, Chungcheongbuk-do (KR); Hyun Jong Yu, Chungcheongbuk-do (KR); Suk Yong Jeon, Chungcheongbuk-do (KR); Eun Ok Oh, Chungcheongnam-do (KR); Sang Wook Lee, Gyeonggi-do (KR); Yoon Young Choi, Seoul (KR)

(73) Assignees: ECOPRO BM CO., LTD., Chungcheongbuk-Do (KR); SAMSUNG SDI CO., LTD., Yongin-si (KR)

( * ) Notice: Subject to any disclaimer, the term of this patent is extended or adjusted under 35 U.S.C. 154(b) by 225 days.

(21) Appl. No.: 16/068,303

(22) PCT Filed: Jan. 2, 2017

(86) PCT No.: PCT/KR2017/000006
§ 371 (c)(1),
(2) Date: Jul. 5, 2018

(87) PCT Pub. No.: WO2017/119681
PCT Pub. Date: Jul. 13, 2017

(65) Prior Publication Data
US 2019/0020026 A1 Jan. 17, 2019

(30) Foreign Application Priority Data
Jan. 5, 2016 (KR) .......... 10-2016-0001005

(51) Int. Cl.
*H01B 1/08* (2006.01)
*H01M 4/525* (2010.01)
(Continued)

(52) U.S. Cl.
CPC ............ *H01M 4/525* (2013.01); *C01G 51/42* (2013.01); *C01G 53/00* (2013.01); *C01G 53/04* (2013.01);
(Continued)

(58) Field of Classification Search
CPC .. H01B 1/00; H01B 1/06; H01B 1/08; H01M 4/525; H01M 4/131; H01M 4/0471; C01G 51/04; C01G 53/04
See application file for complete search history.

(56) References Cited

U.S. PATENT DOCUMENTS

| | | | | |
|---|---|---|---|---|
| 6,132,639 A | * | 10/2000 | Komatsu | ............. H01M 4/52 252/182.1 |
| 9,083,044 B2 | * | 7/2015 | Kim | ............. H01M 4/525 |

(Continued)

FOREIGN PATENT DOCUMENTS

| | | |
|---|---|---|
| KR | 2003-0088247 A | 11/2003 |
| KR | 10-2014-0130280 A | 11/2014 |

(Continued)

OTHER PUBLICATIONS

English language machine translation of KR-1020140130280 (published Nov. 2014).*

*Primary Examiner* — Mark Kopec
(74) *Attorney, Agent, or Firm* — Nath, Goldberg & Meyer; Tanya E. Harkins

(57) ABSTRACT

The present invention relates to a method of producing a cobalt-coated precursor, the cobalt-coated precursor produced by the method and a positive electrode active material for a lithium secondary battery, the positive electrode active (Continued)

material which is prepared using the cobalt-coated precursor and, more particularly, to a method of preparing a new positive electrode active material having improved high capacity and stability by coating cobalt on the surface of a precursor in the precursor step, thereby improving characteristics of the precursor degraded when washed with water, and a positive electrode active material prepared by the method.

8 Claims, 16 Drawing Sheets

(51) Int. Cl.
| | |
|---|---|
| *C01G 53/04* | (2006.01) |
| *C01G 53/00* | (2006.01) |
| *C01G 51/00* | (2006.01) |
| *H01M 4/04* | (2006.01) |
| *H01M 10/052* | (2010.01) |
| *H01M 4/02* | (2006.01) |

(52) U.S. Cl.
CPC ............... *C01G 53/42* (2013.01); *H01B 1/08* (2013.01); *H01M 4/0404* (2013.01); *C01P 2002/52* (2013.01); *C01P 2002/54* (2013.01); *C01P 2002/72* (2013.01); *C01P 2002/85* (2013.01); *C01P 2004/03* (2013.01); *C01P 2004/04* (2013.01); *C01P 2006/40* (2013.01); *H01M 10/052* (2013.01); *H01M 2004/028* (2013.01)

(56) References Cited

U.S. PATENT DOCUMENTS

| | | | |
|---|---|---|---|
| 2004/0091414 A1* | 5/2004 | Fittock | H01M 4/626 423/420.2 |
| 2010/0068376 A1 | 3/2010 | Chen et al. | |
| 2014/0199591 A1* | 7/2014 | Geng | H01M 10/345 429/213 |
| 2018/0040890 A1* | 2/2018 | Choi | H01M 10/0525 |
| 2019/0123350 A1* | 4/2019 | Choi | H01M 4/525 |

FOREIGN PATENT DOCUMENTS

| | | |
|---|---|---|
| KR | 10-2015-00880199 A | 7/2015 |
| WO | 2014/081269 A1 | 5/2014 |

* cited by examiner

METHOD OF PRODUCING COBALT-COATED PRECURSOR, COBALT-COATED PRECURSOR PRODUCED THEREBY, AND POSITIVE ELECTRODE ACTIVE MATERIAL PREPARED USING SAME

BACKGROUND OF THE INVENTION

Field of the Invention

The present invention relates to a method of producing a cobalt-coated precursor, the cobalt-coated precursor produced by the method and a positive active material for a lithium secondary battery, the positive active material which is prepared using the cobalt-coated precursor and, more particularly, to a method of preparing a new positive active material having improved high capacity and stability by coating cobalt on the surface of a precursor in the precursor step, thereby improving characteristics of the precursor degraded when washed with water, and a positive active material prepared by the method.

Related Art

A method of producing a lithium composite oxide generally comprises the steps of producing a transition metal precursor, mixing the transition metal precursor with a lithium compound to obtain a mixture, and firing the mixture.

At that time, LiOH or $Li_2CO_3$ is used as the lithium compound. In general, it has been known to be preferable that $Li_2CO_3$ is used when the positive active material contains Ni in an amount of 65% or less, and LiOH is used when the positive active material contains Ni in an amount of 65% or more.

However, a Ni rich system containing Ni in the amount of 65% or more rather has a problem of a high residual amount of lithium existing in the form of LiOH or $Li_2CO_3$ on the surface of the positive active material due to a low temperature reaction. Such residual lithium, i.e., unreacted LiOH or $Li_2CO_3$ is made to react with an electrolyte and the like in a battery to generate gas and induce a swelling phenomenon, thereby causing a problem that high temperature stability of the battery is severely deteriorated. Further, the unreacted LiOH may cause a gelation since the unreacted LiOH has a high viscosity during mixing of a slurry before manufacturing an electrode plate.

A method of introducing a water washing process is being studied to remove such an unreacted Li. However, since damages are generated on the surface of the positive active material during water washing when the water washing process is introduced, problems of deteriorating capacity and efficiency characteristics of the positive active material and increasing resistance thereof during storage at high temperatures are caused.

SUMMARY OF THE INVENTION

In order to solve such problems of the prior art, the present invention provides a method of producing a precursor with secured high capacity, efficiency and lifetime characteristics by introducing the water washing process, thereby improving characteristics of the positive active material degraded in the water washing process while reducing an amount of the unreacted lithium on the surface of the positive active material, and a positive active material for the lithium secondary battery, the positive active material which is prepared by the method.

In order to solve such problems in an aspect, a method of producing a cobalt-coated precursor is provided. The method comprises: a step 1 of mixing a metal mixed solution including a nickel-containing compound, a first cobalt-containing compound, a manganese-containing compound and a metal M, an aqueous ammonia solution as a complexing agent, and a hydroxyl group-providing aqueous alkaline solution as a pH adjusting agent to prepare a solution including a nickel-cobalt composite hydroxide represented by the following chemical formula 1 by a co-precipitation method;

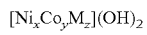
[Chemical Formula 1]

(In chemical formula 1, 0.6≤x≤1.00, 0≤y≤0.20, 0≤z≤0.2, x+y+z=1, and

M is one or more selected from the group consisting of Al, Mn, B, Ba, Cr, F, Li, Mo, P, Sr, Ti and Zr)

a step 2 of preparing a cobalt coating solution including a second cobalt-containing compound;

a step 3 of injecting the solution including the nickel-cobalt composite hydroxide prepared in the step 1 into an aqueous alkaline solution or distilled water, and mixing the cobalt coating solution prepared in the step 2 with the solution including the nickel-cobalt composite hydroxide injected into the aqueous alkaline solution or distilled water to obtain a mixed solution, thereby coating a precursor with the mixed solution to coat cobalt on the precursor;

a step 4 of separating a cobalt-coated precursor; and a step 5 of drying the separated cobalt-coated precursor.

The method of producing the cobalt-coated precursor according to the present invention further may comprise a step 1-1 of separating the nickel-cobalt composite hydroxide from the solution including the nickel-cobalt composite hydroxide prepared in the step 1 and cleaning the separated nickel-cobalt composite hydroxide to prepare a nickel-cobalt composite hydroxide in the form of powder. That is, in the method of producing the cobalt-coated precursor according to the present invention, the nickel-cobalt composite hydroxide prepared in the step 1 may be mixed with the solution in a state that the nickel-cobalt composite hydroxide is separated and dried, or the nickel-cobalt composite hydroxide may be mixed with the solution in a mixed state with the solution.

In the method of producing the cobalt-coated precursor according to the present invention, the second cobalt-containing compound may be cobalt sulfate or cobalt nitrate.

In the method of producing the cobalt-coated precursor according to the present invention, wherein the first cobalt-containing compound and the second cobalt-containing compound may be the same compound.

In the method of producing the cobalt-coated precursor according to the present invention, the cobalt may be coated on the precursor in an amount of 0.1 to 15 mol %.

In the method of producing the cobalt-coated precursor according to the present invention, the step 3 may comprise maintaining temperature of the mixed solution to 10 to 70° C.

In the method of producing the cobalt-coated precursor according to the present invention, the step 5 of performing a drying process may comprise drying the cobalt-coated precursor at a drying temperature of 80 to 200° C. for a drying time of 5 to 20 hours.

In another aspect, a cobalt-coated precursor produced by the method of producing the cobalt-coated precursor according to the present invention is provided.

In another aspect, a method of preparing a positive active material for a lithium secondary battery is provided. The method comprises:

a step 6 of mixing the cobalt-coated precursor produced by the method of producing the cobalt-coated precursor according to the present invention with a lithium compound to obtain a mixture; and a step 7 of heat-treating the mixture to obtain a lithium metal composite oxide.

In the method of preparing the positive active material for the lithium secondary battery according to the present invention, the step 7 may comprise firing the mixture at 650 to 850° C. in an oxygen atmosphere.

The method of preparing the positive active material for the lithium secondary battery according to the present invention further may comprise a step 8 of injecting distilled water into a reactor, constantly maintaining temperature of the distilled water, injecting the lithium metal composite oxide obtained in the step 7 into the constant temperature-maintained distilled water to stir the lithium metal composite oxide with the constant temperature-maintained distilled water.

In another aspect, a positive active material for a lithium secondary battery, which is prepared by the method of preparing the positive active material for the lithium secondary battery according to the present invention, is provided.

The positive active material for the lithium secondary battery according to the present invention may comprise 0.15 wt % or less of a residual lithium.

The positive active material for the lithium secondary battery according to the present invention may have a $2\theta$ value at XRD exhibiting a corresponding peak of $LiCoO_2$ in a range of 45° to 46°, 18° to 19° or 37° to 38°.

DESCRIPTION OF EXEMPLARY EMBODIMENTS

Figure 1A:
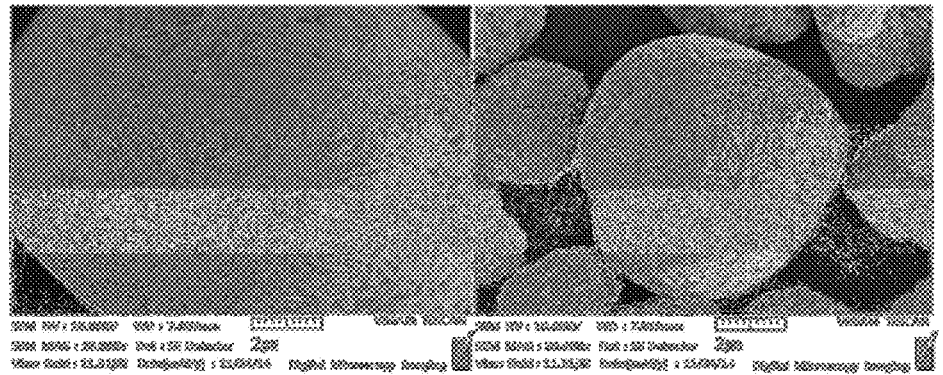
FIG. 1A to 1C illustrate results of measuring Scanning Electron Microscope (SEM) photographs of the positive active materials produced in an Example and a Comparative Example of the present invention.

Hereinafter, the present invention is described more in detail by Examples. However, the present invention is not limited to the following Examples.

EXAMPLES

After putting 20 L of distilled water and 840 g of ammonia as a chelating agent into a batch reactor (with a capacity of 70 L and a spinning motor having output power of greater than or equal to 80 W), the distilled water and ammonia were stirred by rotating the motor to a rotation speed of 400 rpm while maintaining an internal temperature of the reactor to 50° C.

A first aqueous precursor solution with a concentration of 2.5 M in which nickel sulfate, cobalt sulfate and aluminum had been mixed at a molar ratio of 89.5:7.5:3.0 and an aqueous ammonia solution with a concentration of 28% were continuously injected into a reactor at flow rates of 2.2 liter/hour and 0.15 liter/hour respectively. Further, an aqueous sodium hydroxide solution with a concentration of 25% for adjusting the pH value of a resulting mixed solution was supplied into the reactor such that the mixed solution was maintained at a pH value of 11. An impeller speed was adjusted to 400 revolutions per minutes (rpm).

After completing the reaction, a spherical nickel-cobalt-aluminum composite hydroxide precipitate was obtained from a batch reactor.

After filtering the precipitated metal composite hydroxide and washing the filtered metal composite hydroxide with water, the metal composite hydroxide washed with water was dried in a 110° C. hot air dryer for 12 hours to obtain a $NiCoAl(OH)_2$ precursor powder in a metal composite oxide form.

After preparing distilled water, constantly maintaining temperature of the distilled water, and injecting the produced precursor for the lithium secondary battery into the distilled water, the surface of the precursor was coated with cobalt by stirring the aqueous cobalt solution with the precursor injected into the distilled water while injecting an aqueous cobalt solution into the precursor-containing distilled water at a predetermined ratio for 3 hours.

After filtering and separating the metal composite hydroxide, and mixing the metal composite hydroxide with lithium hydroxide (LiOH) at a mole ratio of 1:1.02 to obtain a mixture, the mixture was heated at a heating rate of 2° C./min, and the heated mixture was fired at 790° C. for 20 hours. After this, a positive active material powder of Example 1 with an increased cobalt content was obtained by washing a positive active material with water and drying the positive active material washed with water at 250° C.

TABLE 1

| Classification | mol % | | | | Co Coating |
| --- | --- | --- | --- | --- | --- |
| | Li | Ni | Co | Al | |
| Example 1 | 1.01 | 88.2 | 9.0 | 2.8 | 1.5 mol |
| Example 2 | 1.02 | 86.6 | 10.6 | 2.8 | 3.0 mol |

TABLE 1-continued

| | mol % | | | | |
|---|---|---|---|---|---|
| Classification | Li | Ni | Co | Al | Co Coating |
| Example 3 | 1.03 | 85.5 | 11.7 | 2.9 | 4.5 mol |
| Example 4 | 1.02 | 88.1 | 8.9 | 3.1 | 1.5 mol |
| Example 5 | 1.02 | 86.4 | 10.6 | 3.1 | 3.0 mol |
| Comparative Example 1 | 1.03 | 89.5 | 7.6 | 3.0 | |
| Comparative Example 2 | 1.01 | 89.5 | 7.6 | 3.0 | |
| Comparative Example 3 | 1.01 | 87.6 | 11.2 | 3.1 | |

Positive active material powders were prepared in Examples 2 and 3 by the same method as Example 1 except that a coating amount of cobalt was varied in Example 1.

Examples

After producing a precursor by mixing Ni, Co and Al at a ratio of 89.5:7.5:3.0 by the method of Example 1, precursors and positive active materials of Examples 4 and 5 were prepared by additionally injecting aqueous cobalt solutions into the solution including the precursor without filtering or drying a solution including the precursor, thereby coating the surface of the precursor with the aqueous cobalt solutions.

Comparative Examples

After preparing a positive active material without coating the surface of a precursor with cobalt, an active material of Comparative Example 1 was prepared without washing the positive active material with distilled water. Further, active material of Comparative Examples 2 and 3 were prepared by the same method as Example 1 except that the surface of the precursor was not coated with cobalt.

<Experimental Example> Measurement of SEM Photographs

Figure 1B:
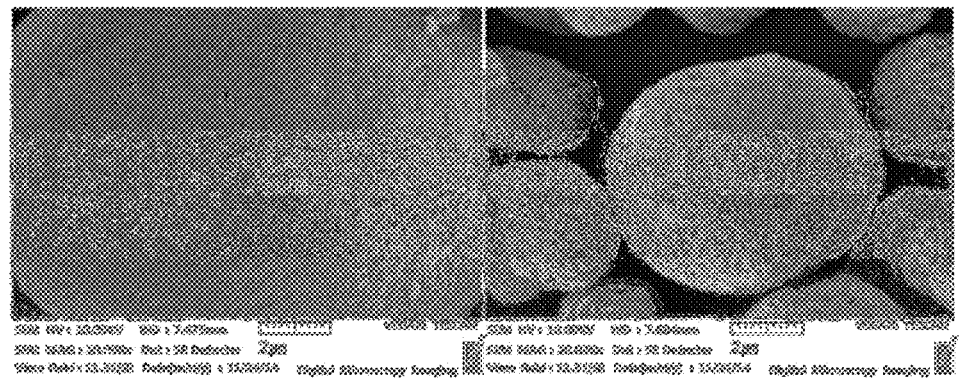
Figure 1C:
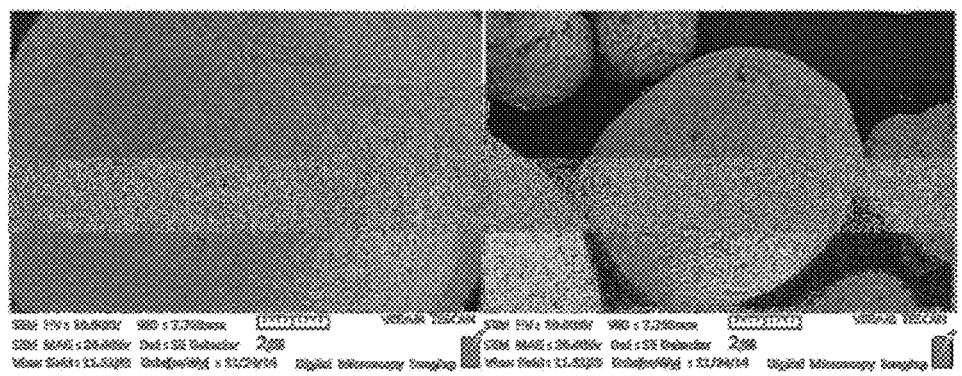

After measuring SEM photographs of the positive active material prepared in Examples 1 and 2, and Comparative Examples, measurement results are shown in FIG. 1A to 1C. It can be seen from FIG. 1A to 1C that pores in surfaces of the positive active material in Examples of the present invention tend to decrease.

<Experimental Example> Measurement of TEM and EDS

Figure 2:
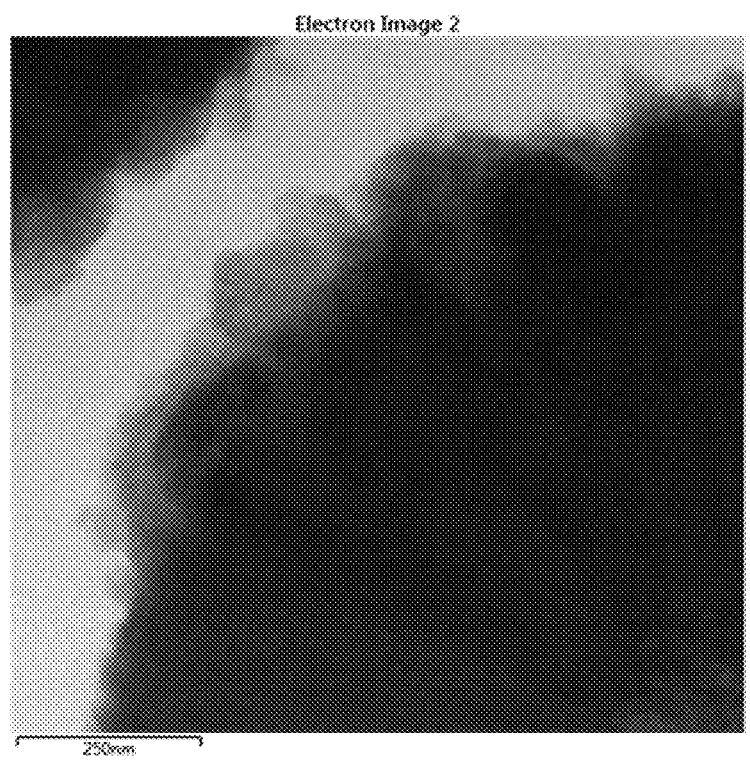
FIG. 2, FIGS. 3A, and 3B illustrate a Transmission Electron Microscope (TEM) photograph and an Energy Dispersive Spectroscopy (EDS) photograph measured in the vicinity of the surface of the positive active materials produced in an Example of the present invention.
Figure 3A:
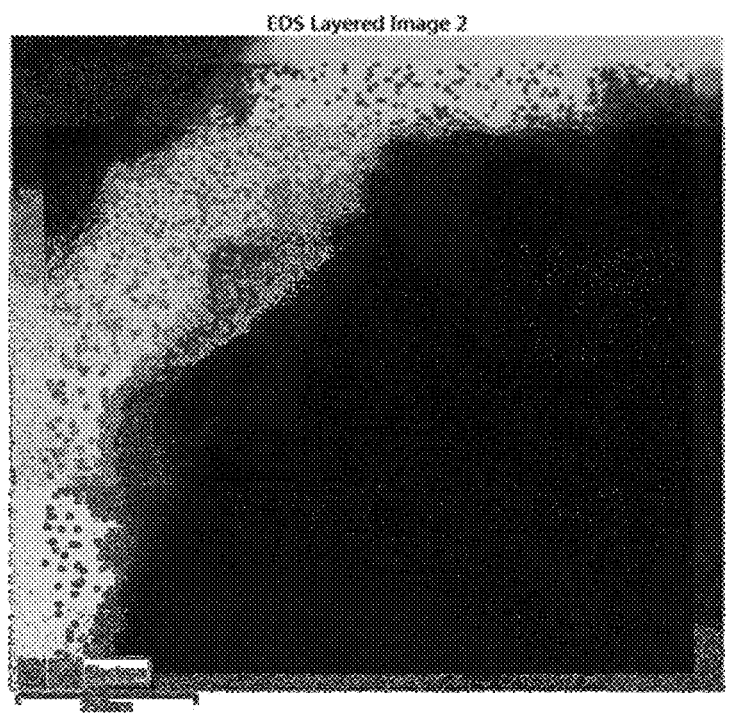
Figure 3B:
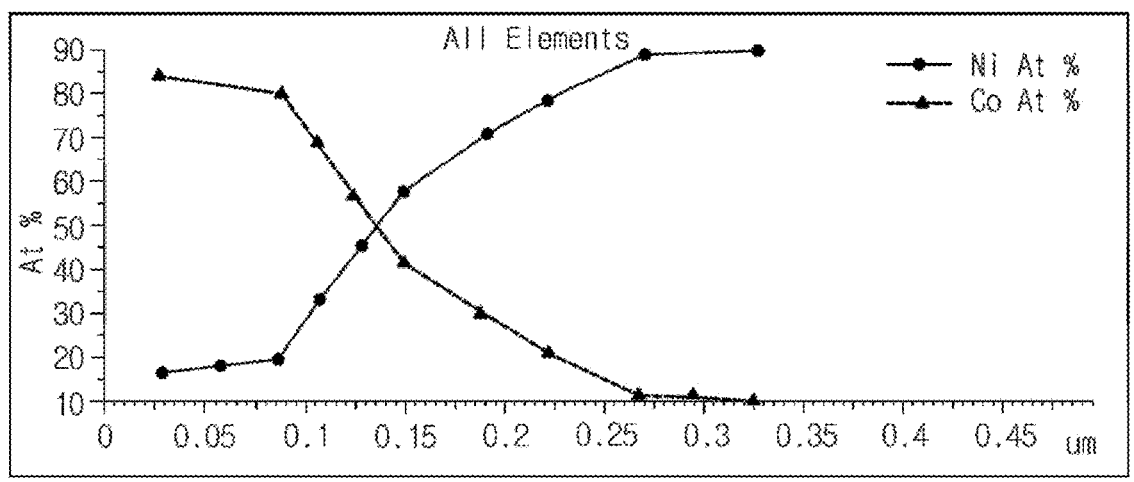

After measuring a TEM photograph and an EDS photograph in the vicinity of the surface of the positive active material prepared in Example 1, measurement results are shown in FIG. 2, FIGS. 3A, and 3B.

It can be confirmed from FIG. 2, FIGS. 3A, and 3B that Co contents are increased to a point corresponding to 0.1 μm located to an inner side from outermost layers of the active materials.

<Experimental Example> Measurement of Unreacted Lithium

Measurement of the unreacted lithium is made by an amount of 0.1 M HCl used until a pH value becomes 4 by performing a pH titration method. After injecting 5 g of a positive active material into 100 ml of deionized water (DIW), stirring the positive active material in DIW for 15 minutes to obtain a stirred material, filtering the stirred material to obtain a filtered solution, collecting 50 ml of the filtered solution out of the obtained filtered solution, and adding 0.1 M HCl to the 50 ml of the filtered solution, Q1 and Q2 are determined by measuring HCl consumption amounts according to variations of pH values, unreacted LiOH and $Li_2CO_3$ are calculated according to the following calculation formulas, and results are shown in Table 2 as follows:

M1=23.94 (LiOH Molecular weight)

M2=73.89 ($Li_2CO_3$ Molecular weight)

SPL Size=(Sample weight×Solution weight)/Water weight

LiOH (wt %)=[(Q1−Q2)×M1×100]/(SPL Size×1000)

$Li_2CO_3$ (wt %)=[2×Q2×C×M2/2×100]/(SPL Size×1000)

TABLE 2

| | Residual Li | | |
|---|---|---|---|
| Classification | LiOH, ppm | $Li_2CO_3$, ppm | Total Li wt % |
| Example 1 | 636 | 2492 | 0.065 |
| Example 2 | 403 | 2512 | 0.059 |
| Example 3 | 606 | 3011 | 0.074 |
| Example 4 | 403 | 2512 | 0.059 |
| Example 5 | 606 | 3011 | 0.074 |
| Comparative Example 1 | 7035 | 9455 | 0.381 |
| Comparative Example 2 | 601 | 2259 | 0.060 |
| Comparative Example 3 | 1594 | 1009 | 0.065 |

Experimental Examples> Evaluation of Charge and Discharge Characteristics

Figure 4:
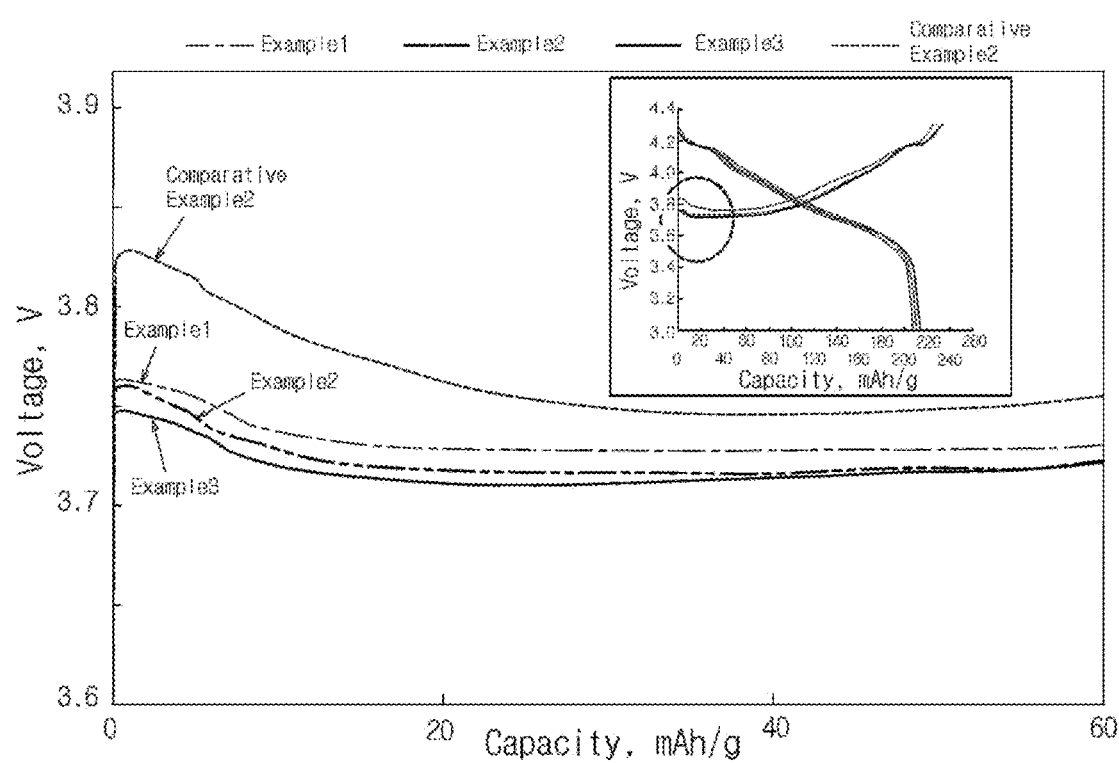
FIG. 4 illustrates a result of performing a charge/discharge experiment of a coin cell including active materials prepared in an Example and a Comparative Example of the present invention.

After manufacturing respective coin cells by using the positive active materials prepared in Examples 1 to 5 and Comparative Examples 1 to 3 as cathodes and using lithium metals as anodes, and performing charge and discharge experiments at a C/10 charging speed and a C/10 discharging speed (1C=150 mA/g) in a voltage range of 3 to 4.3 V, results of the experiments are shown in FIG. 4 and Table 3.

It can be confirmed from FIG. 4 that initial resistance values are lowered as Co concentration values of Co coating solutions increase.

TABLE 3

| Item | | unit | Example 1 | Example 2 | Example 3 | Example 4 | Example 5 | Comparative Example 1 | Comparative Example 2 | Comparative Example 3 |
|---|---|---|---|---|---|---|---|---|---|---|
| 4.3 V~3.0 V 0.1 C | charge | mAh/g | 232.0 | 230.4 | 226.3 | 231.5 | 229.8 | 231.1 | 233.1 | 233.5 |
| | discharge | | 213.1 | 212.2 | 208.5 | 211.4 | 212.5 | 208.1 | 210.4 | 206.1 |
| | Eff | % | 91.8% | 92.1% | 92.1% | 91.3% | 92.5% | 90.1% | 90.3% | 88.3% |

Experimental Examples> Measurement Evaluation of C-Rate Characteristics

Figure 5A:
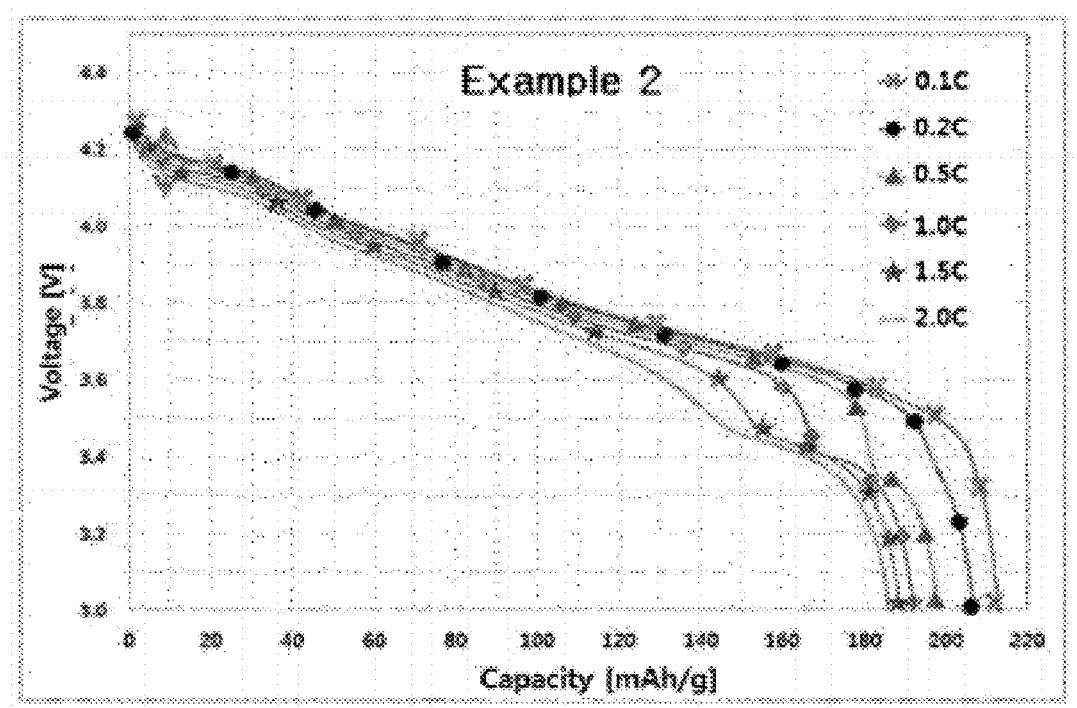
FIGS. 5A and 5B illustrate a result of measuring C-rate values of the coin cell including the active materials prepared in an Example and a Comparative Example of the present invention.
Figure 5B:
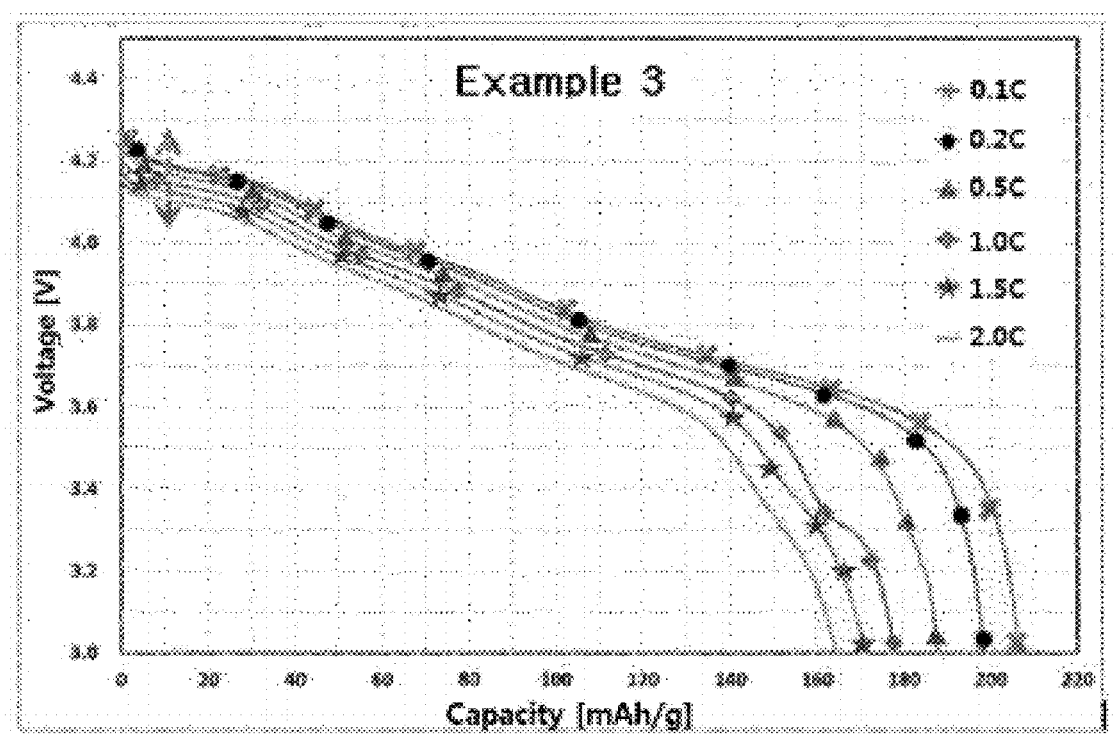

After measuring C-rate values of coil cells using the positive active materials prepared in Example 2 and Comparative Example 2, measurement results are shown in Table 4, FIGS. 5A, and 5B as follows.

TABLE 4

| | Example 2 | | Comparative Example 3 | |
|---|---|---|---|---|
| Item | Discharge, mAh/g | Retention, % | Discharge, mAh/g | Retention, % |
| 0.1 C | 212.2 | 100% | 206.1 | 100% |
| 0.2 C | 206.2 | 97% | 198.9% | 97% |
| 0.5 C | 197.6 | 93% | 188.3% | 91% |
| 1.0 C | 191.8 | 90% | 178.5% | 87% |
| 1.5 C | 188.4 | 89% | 171.5% | 83% |
| 2.0 C | 185.8 | 88% | 164.9% | 80% |

Figure 6A:
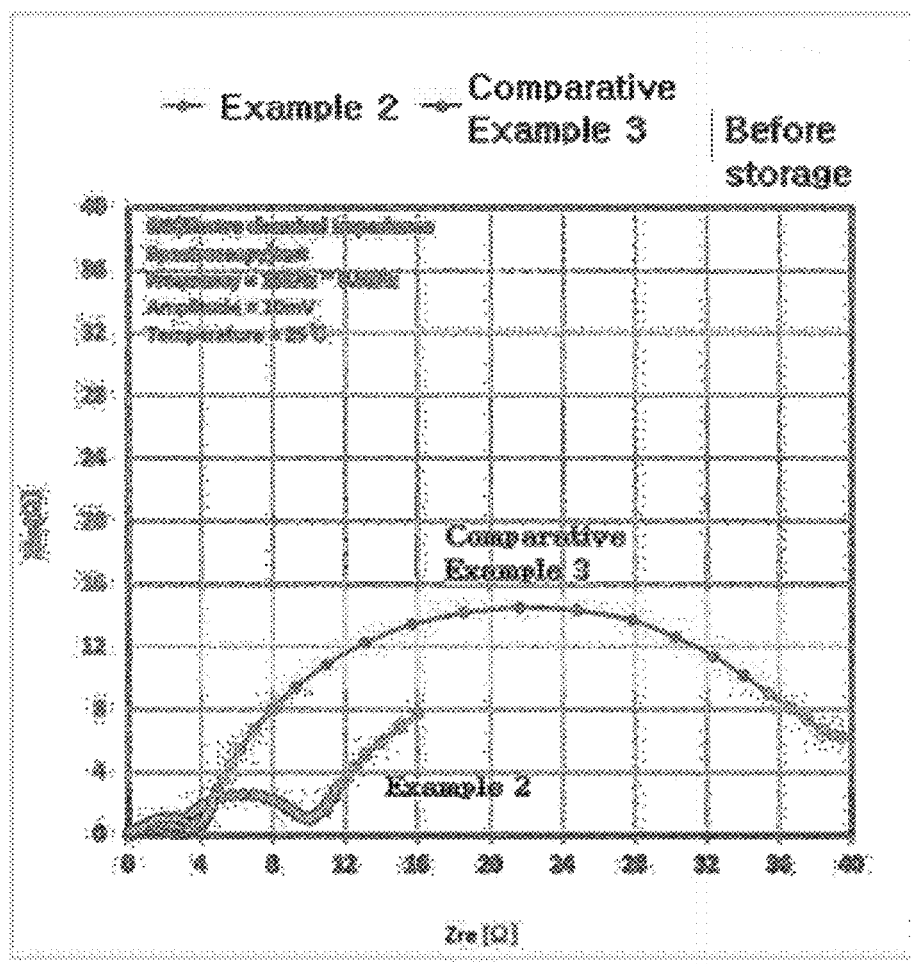
FIGS. 6A and 6B illustrate a result of measuring impedance change characteristics after high temperature storage of the coin cell including the active materials prepared in an Example and a Comparative Example of the present invention.
Figure 6B:
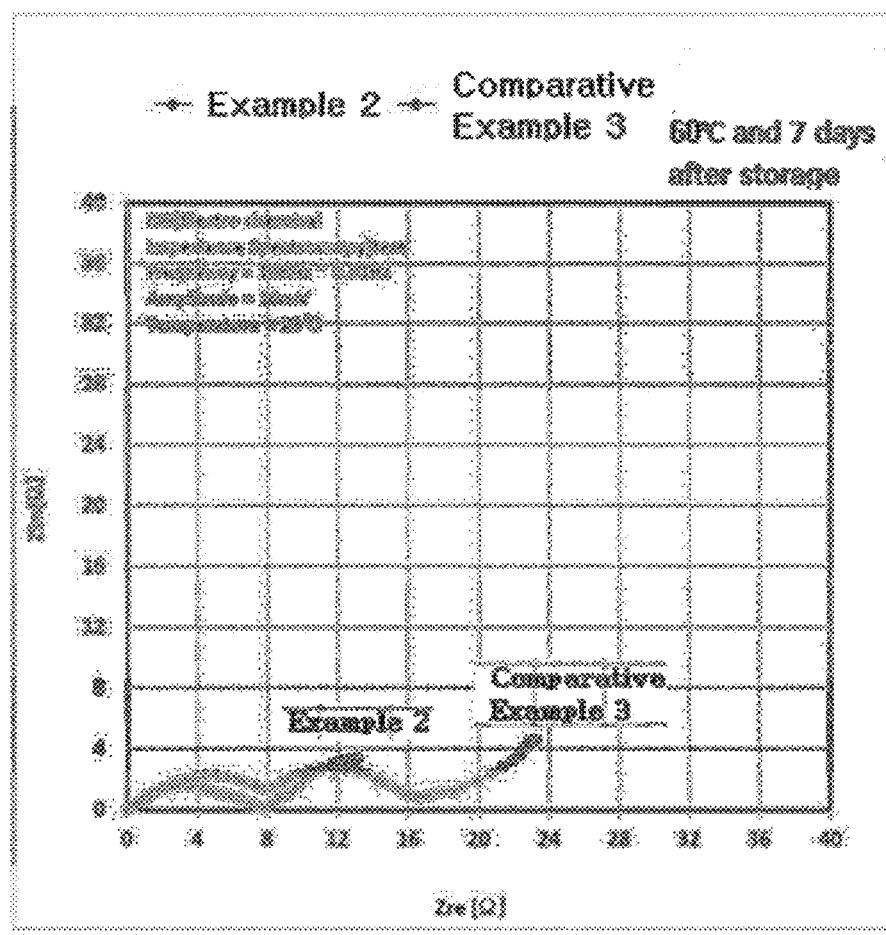

Experimental Examples> Measurement Results of Impedance Values Before and after High Temperature Storage After measuring impedance values before and after high temperature storage of the coil cells using the positive active materials prepared in Example 2 and Comparative Example 2, measurement results are shown in FIGS. 6A and 6B.

It can be confirmed from FIGS. 6A and 6B that impedance values before and after high temperature storage are decreased in case of Example 2 in which a cobalt coating process is performed in the precursor step.

<Experimental Examples> Measurement Results of Lifetime Characteristics

Figure 7:
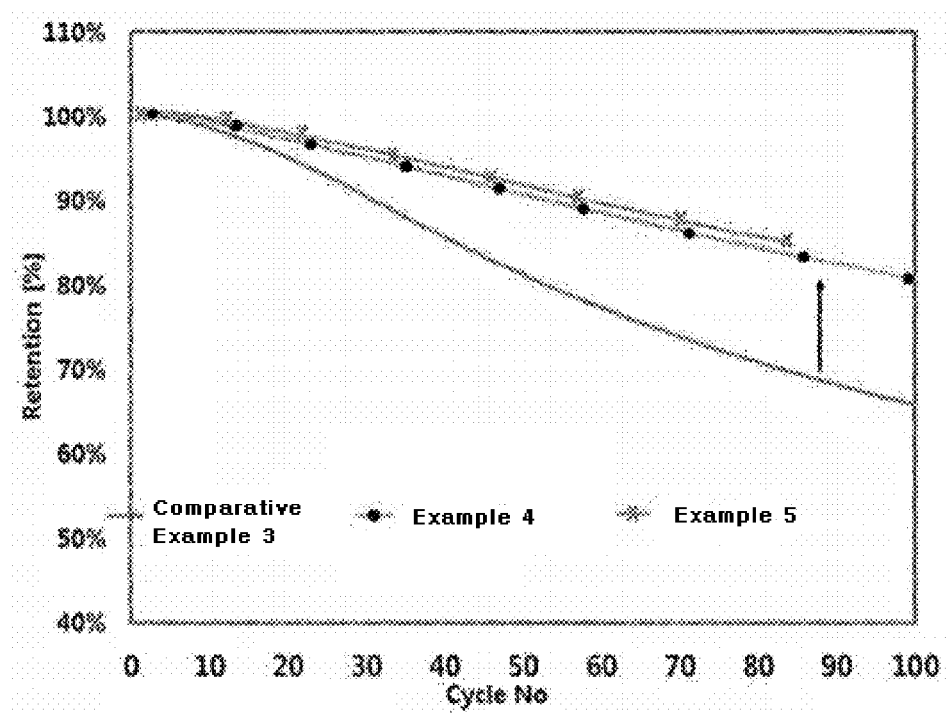
FIG. 7 illustrates a result of measuring lifetime characteristics of a battery including the active materials prepared in an Example and a Comparative Example of the present invention.
Figure 8A:
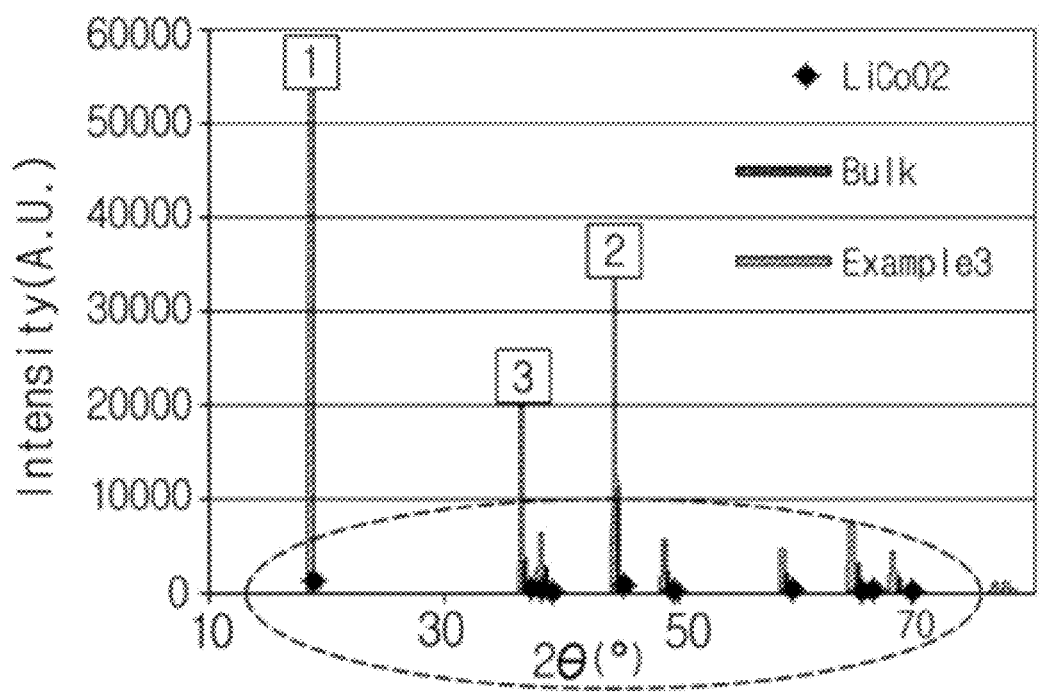
FIG. 8A to 8D illustrate a result of measuring X-ray diffraction (XRD) values with respect to positive active materials prepared in an Example and a Comparative Example of the present invention.
Figure 8B:
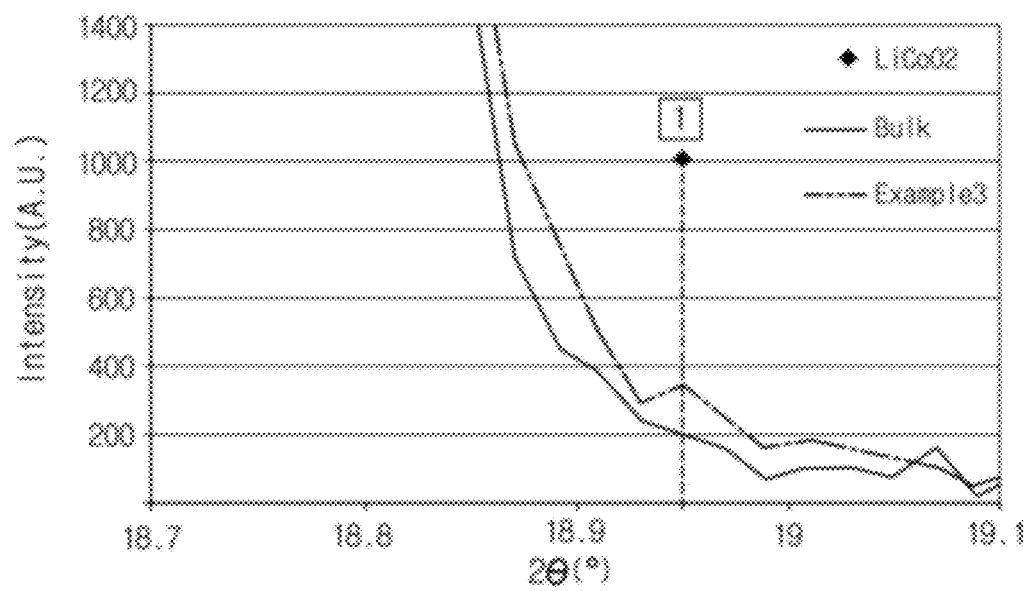
Figure 8C:
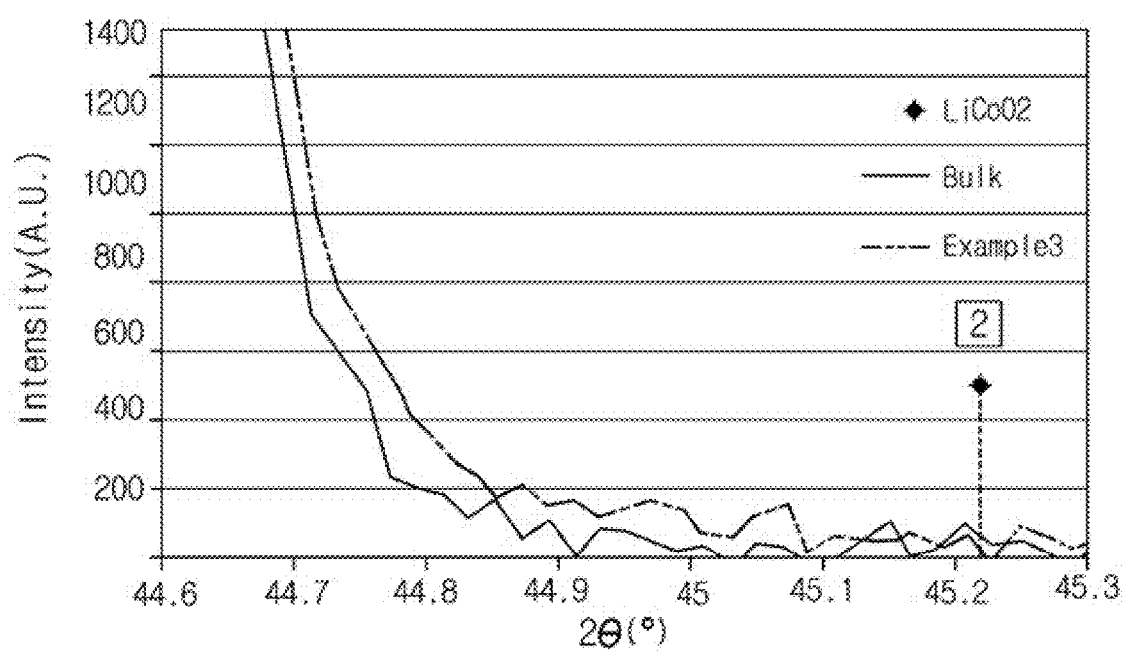
Figure 8D:
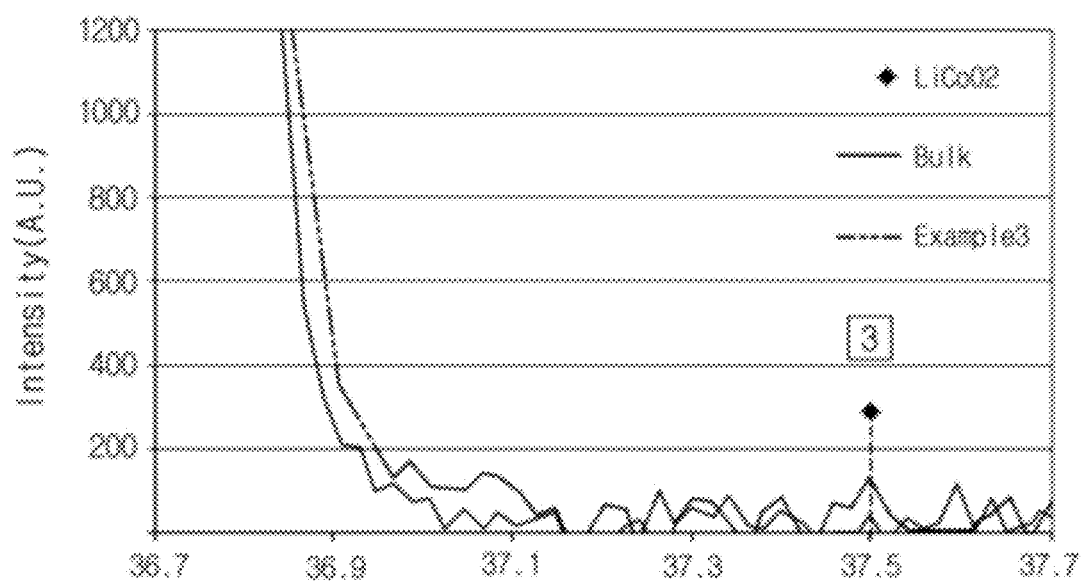

After measuring lifetime characteristics of coin cells manufactured in Examples 4 and 5 using positive active materials prepared by directly mixing the precursor with a cobalt coating solution without drying the precursor and Comparative Example 2, measurement results are shown in FIG. 7.

It can be seen from FIG. 7 that the positive active materials prepared in Examples of the present invention have greatly improved lifetime characteristics compared to those prepared in Comparative Examples.

<Experimental Examples> Measurement Results of XRD

FIG. 8A to 8D show measured results of XRD with respect to the positive active materials prepared in Example and Comparative Example of the present invention.

The present invention can prepare a positive active material for a secondary battery having high capacity and improved lifetime by coating the surface of the precursor with cobalt to reduce the amount of the unreacted lithium on the surface of the active material, washing the surface of the active material prepared using the cobalt-coated precursor with water to reduce an amount of unreacted lithium, and post-drying or heat-treating the active material having its surface washed with water.

What is claimed is:

1. A method of producing positive active material for a lithium secondary battery comprising the following steps:
   a step 1 of mixing a metal mixed solution including a nickel-containing compound, a first cobalt-containing compound, an aqueous ammonia solution as a complexing agent, and a hydroxyl group-providing aqueous alkaline solution as a pH adjusting agent to prepare materials including a nickel-cobalt composite hydroxide represented by the following chemical formula 1 by a co-precipitation method;

[Ni$_x$Co$_y$M$_z$](OH)$_2$     [Chemical Formula 1]

(In chemical formula 1, 0.6≤x<1.00, 0≤y≤0.20, 0≤z≤0.2, x+y+z=1, and
   M is one or more selected from the group consisting of Al, Mn, B, Ba, Cr, F, Li, Mo, P, Sr, Ti and Zr)
   a step 2 of preparing cobalt sulfate or cobalt nitrate as a second cobalt-containing compound;
   a step 3 of injecting the materials including the nickel-cobalt composite hydroxide prepared in the step 1 into an aqueous alkaline solution or distilled water, and mixing the cobalt sulfate or the cobalt nitrate containing compound prepared in the step 2 with the materials including the nickel-cobalt composite hydroxide injected into the aqueous alkaline solution or distilled water to obtain cobalt-coated materials;
   a step 4 of separating the cobalt-coated materials;
   a step 5 of drying the separated cobalt-coated materials to prepare a cobalt-coated precursor;
   a step 6 of mixing the prepared cobalt-coated precursor with a lithium compound to obtain a mixture; and
   a step 7 of heat-treating the mixture to obtain a lithium metal composite oxide.

2. The method of claim 1, further comprising a step 1-1 of separating the nickel-cobalt composite hydroxide from the materials including the nickel-cobalt composite hydroxide prepared in the step 1 and cleaning the separated nickel-cobalt composite hydroxide to prepare a nickel-cobalt composite hydroxide in the form of powder.

3. The method of claim 1, wherein the first cobalt-containing compound and the second cobalt-containing compound are the same compound.

4. The method of claim 1, wherein the cobalt is coated on the precursor in an amount of 0.1 to 15 mol %.

5. The method of claim 1, wherein the step 5 of performing a drying process comprises performing the drying process at a drying temperature of 80 to 200° C. for a drying time of 5 to 20 hours.

6. The method of claim 1, wherein the step 3 comprises maintaining temperature of the mixed solution to 10 to 70° C.

7. The method of claim 1, wherein the step 7 comprises firing the mixture at 650 to 850° C. in an oxygen atmosphere.

8. The method of claim 1, further comprising a step 8 of injecting distilled water into a reactor, constantly maintaining temperature of the distilled water, injecting the lithium metal composite oxide obtained in the step 7 into the constant temperature-maintained distilled water to stir the lithium metal composite oxide with the constant temperature-maintained distilled water.

* * * * *